(12) United States Patent
Umetsu et al.

(10) Patent No.: US 12,132,377 B2
(45) Date of Patent: Oct. 29, 2024

(54) PACKAGE AND METHOD FOR MANUFACTURING PACKAGE

(71) Applicant: Hitachi Metals, Ltd., Tokyo (JP)

(72) Inventors: Jun Umetsu, Tokyo (JP); Noriyuki Takahashi, Tokyo (JP)

(73) Assignee: Proterial, Ltd., Tokyo (JP)

( * ) Notice: Subject to any disclaimer, the term of this patent is extended or adjusted under 35 U.S.C. 154(b) by 317 days.

(21) Appl. No.: 17/588,960

(22) Filed: Jan. 31, 2022

(65) Prior Publication Data
US 2022/0255397 A1  Aug. 11, 2022

(30) Foreign Application Priority Data
Feb. 9, 2021  (JP) ................. 2021-019098

(51) Int. Cl.
*H02K 5/22*  (2006.01)

(52) U.S. Cl.
CPC ......... *H02K 5/225* (2013.01); *H02K 2203/06* (2013.01)

(58) Field of Classification Search
CPC ........................... H02K 5/225; H02K 2203/06
USPC .......................................................... 310/71
See application file for complete search history.

(56) References Cited

U.S. PATENT DOCUMENTS

| | | | |
|---|---|---|---|
| 10,978,928 | B2 | 4/2021 | Mashiko et al. |
| 2021/0013761 | A1* | 1/2021 | Mashiko ............... H02K 5/225 |
| 2021/0184533 | A1 | 6/2021 | Mashiko et al. |

FOREIGN PATENT DOCUMENTS

| | | | | |
|---|---|---|---|---|
| JP | H03-248448 | A | | 11/1991 |
| JP | H03-289415 | A | | 12/1991 |
| JP | 09221191 | A | * | 8/1997 |
| JP | H11-059774 | A | | 3/1999 |
| JP | 6673518 | B | | 3/2020 |
| WO | WO-2011124205 | A2 | * | 10/2011 ........... A23C 9/1307 |

OTHER PUBLICATIONS

"Notice of Reasons for Refusal" Office Action issued in JP 2021-019098; mailed by the Japanese Patent Office on May 28, 2024.
"Notice of Reasons for Refusal" Office Action issued in JP 2021-019098; mailed by the Japanese Patent Office on Jul. 30, 2024.

* cited by examiner

*Primary Examiner* — Jose A Gonzalez Quinones
(74) *Attorney, Agent, or Firm* — Studebaker & Brackett PC

(57) ABSTRACT

A package includes therein a power distribution member including a plurality of conductive wires which is sealed in a packaging bag. An oxygen concentration in the packaging bag is lower than that in the atmosphere.

6 Claims, 9 Drawing Sheets

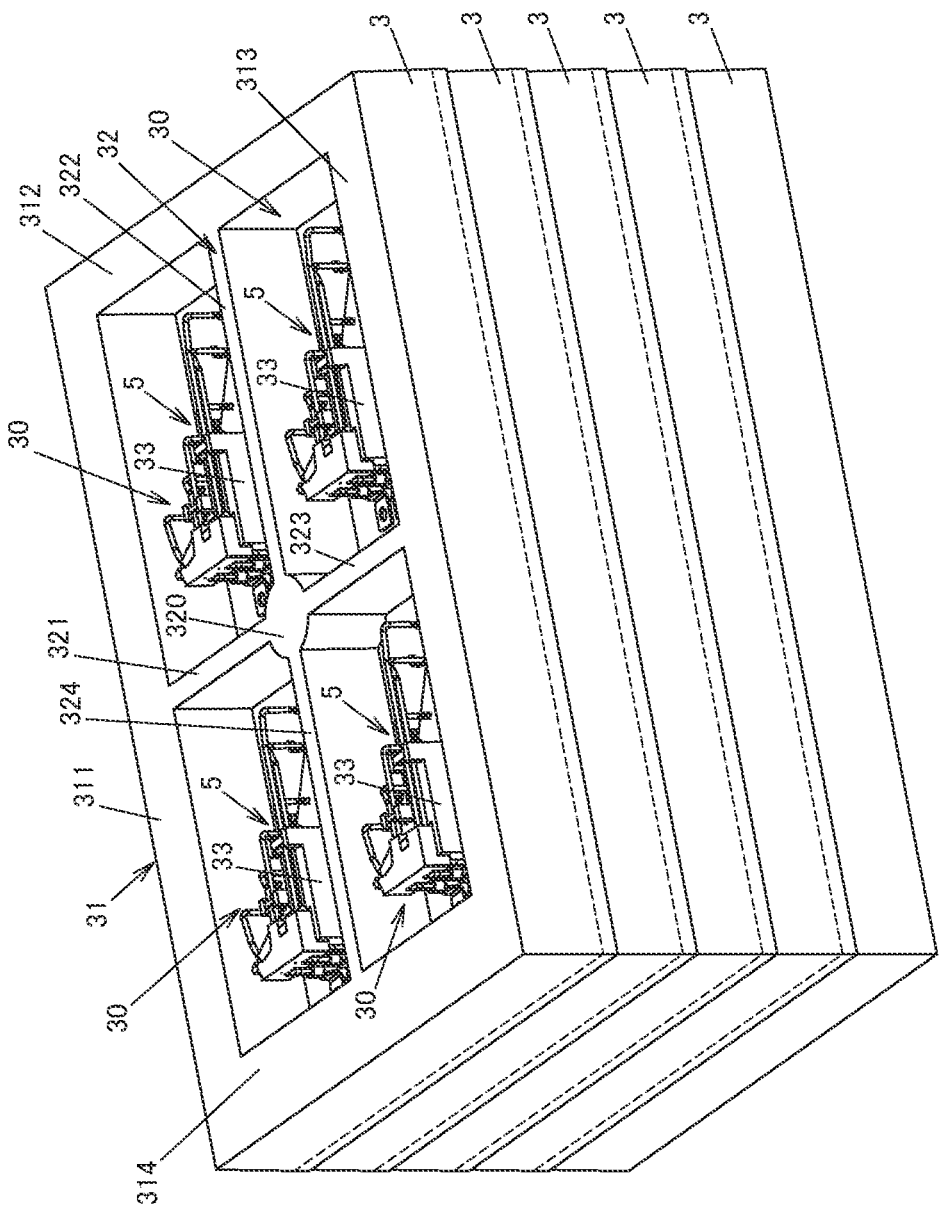

PACKAGE AND METHOD FOR MANUFACTURING PACKAGE

CROSS-REFERENCE TO RELATED APPLICATIONS

The present patent application claims the priority of Japanese patent application No. 2021-019098 filed on Feb. 9, 2021, and the entire contents of Japanese patent application No. 2021-019098 are hereby incorporated by reference.

TECHNICAL FIELD

The present invention relates to a package and a method for manufacturing a package.

BACKGROUND ART

A power distribution member described in Patent Literature 1 is known as a conventional. power distribution member that connects between, e.g., a terminal block and windings of an electric motor used as a driving source for travel of an automobile. The power distribution member described in Patent Literature I is configured such that plural conductive wires each composed of a single wire are integrally held by a resin holder, and respective ends of the plural conductive wires are connected to the windings of the electric motor by welding.

CITATION LIST

Patent Literature

Patent Literature 1: Japanese Patent No.6673518

SUMMARY OF THE INVENTION

If a long period of time passes between when the power distribution member described above is manufactured and when it is connected to the electric motor, there is a possibility that oxidation of surfaces of the plural conductive wires occurs. When the surfaces are oxidized, it may be difficult to connect the conductive wires to the windings of the electric motor.

Therefore, it is an object of the invention to provide a package capable of suppressing oxidation of conductive wires of power distribution members that are items to be packaged, and a method for manufacturing such a package.

So as to achieve the above object, one aspect of the invention provides: a package in which a power distribution member comprising a plurality of conductive wires is sealed in a packaging bag, wherein an oxygen concentration in the packaging bag is lower than an oxygen concentration in an atmosphere.

Further, so as to achieve the above object, another aspect of the invention provides: a method for manufacturing the package as described above, the method comprising:
holding the plurality of the power distribution members so as to be held in the trays;
housing the trays holding the power distribution members in the packaging bag;
reducing an amount of oxygen in the packaging bag; and
hermetically closing an opening of the packaging bag.

Effects of the Invention

According to the present invention, it is possible to provide a package capable of suppressing oxidation of conductive wires of power distribution members that are items to be packaged, and a method for manufacturing such a package.

BRIEF DESCRIPTION OF DRAWINGS

FIG. 3 is a perspective view showing a state in which the tray located uppermost among the plural trays is removed.

BEST MODE FOR CARRYING OUT THE INVENTION

Embodiment

Figure 1:
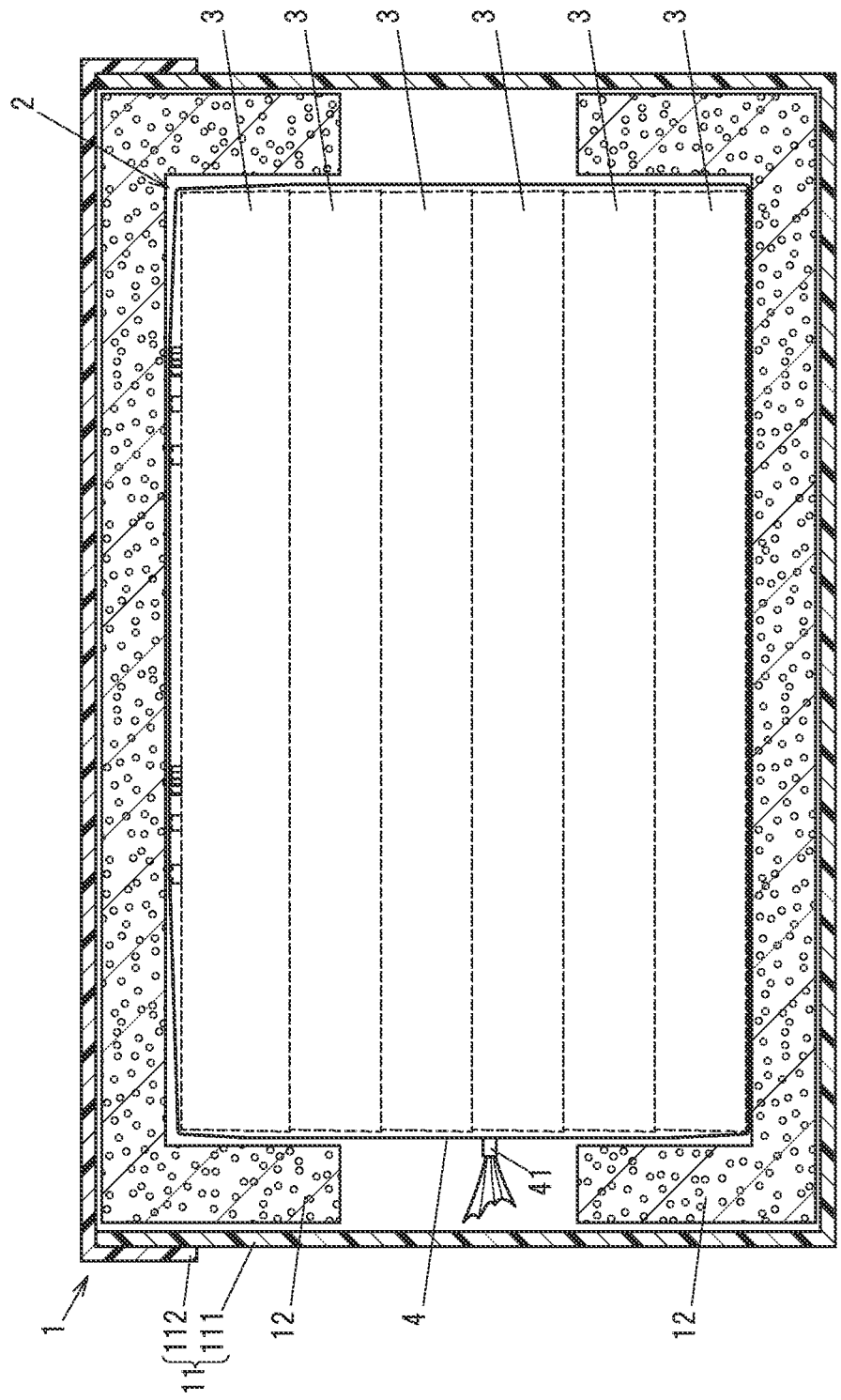
FIG. 1 is a cross-sectional view showing a packed body in which a package in an embodiment of the present invention is housed in a packing case.

FIG. 1 is a cross-sectional view showing a packed body in which a package in an embodiment of the invention is housed in a packing case. A packed body 1 is composed of a packing case 11, cushioning materials 12 housed in the packing case 11, and a package 2.

The packing case 11 has a container box (i.e., a rectangular box opened at the top)-shaped main body 111, and a lid 112 closing an opening of the main body 111. The main body 111 and the lid 112 are made of, e.g., a resin but may be made of a metal or a cardboard.

The cushioning materials 12 configured to reduce a shock transmitted to the package 2 during transport are housed in the packing case 11. In the example shown in FIG. 1, two cushioning materials 12 are housed in the packing case 11 and the package 2 is arranged between these cushioning materials 12.

The package 2 includes plural trays 3 holding plural power distribution members (described later) as items to be packaged and a packaging bag 4, and the plural trays 3 are housed in the sealed packaging bag 4. The packaging bag 4 is hermetically closed. by, e.g., heat fusing (heat sealing) at a closing portion 41 provided near an opening. It is desirable to use the packaging bag 4 with low oxygen permeability and it is possible to suitably use, e.g., an aluminum bag formed by applying an aluminum deposition layer and a coating layer onto a surface of a sheet-shaped base material made of a thermoplastic resins such as PE (polyethylene) or PET (polyethylene terephthalate).

Plural trays 3 are stacked and form a stacked structure inside the packaging bag 4. All of these trays 3 have the same shape. In the following description, a stacking direction of the trays 3 is an up-and-down direction, one side in the stacking direction is referred to as an upper side, and the other side in the stacking direction is referred to as a lower side. However, the stacking direction of the plural trays 3 during transport, etc., may not necessarily be the up-and-down direction which is a vertical direction.

In the example shown in FIG. 1, six trays 3 stacked in the up-and-down direction are indicated by broken lines. The package 2 in a state of being packed in the packing case 11 is transported to a destination. At the destination, the packing case 11 is unpacked and the package 2 is taken out of the main body 111, and the plural trays 3 are then further taken out of the packaging bag 4.

Figure 2:
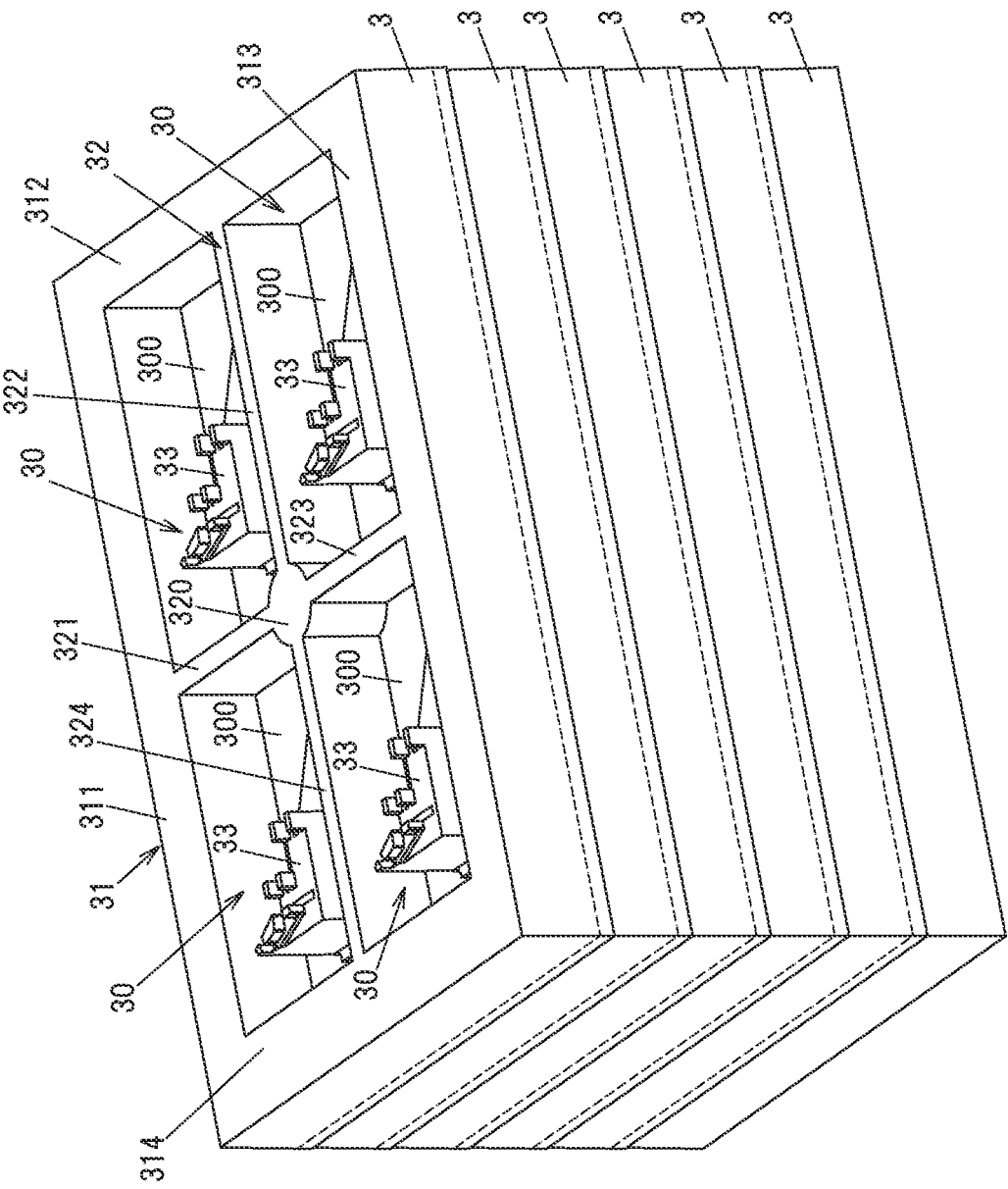
FIG. 2 is a perspective view showing plural trays taken out of a packaging bag.

FIG. 2 is a perspective view showing the plural trays 3 taken out of the packaging bag 4.

FIG. 3 is a perspective view showing a state in which the tray 3 located uppermost (located on the opening side of the tray 3) among the plural trays 3 is removed.

The tray 3 is made of, e.g., a resin such as PET, PP (polypropylene) or PE (polyethylene), The tray 3 is formed by vacuum forming performed in such a manner that, e.g., a sheet-shaped material softened by heating is placed onto a mold, is forced against the mold by evacuating the air between the material and the mold and is then solidified by cooling. Alternatively, the tray 3 may be formed by injection molding.

The tray 3 integrally has an outer frame 31, and a partition wall 32 dividing the inside of the outer frame 31 into plural housing chambers 30. The outer frame 31 is composed of first to fourth outer walls 311 to 314 that form a rectangle. The first outer wall 311 and the third outer wall 313 are parallel to each other, and the second outer wall 312 and the fourth outer wall 314 are parallel to each other. The partition wall 32 is composed of a central pillar 320 provided in the center of the outer frame 31, and first to fourth inner walls 321 to 324 respectively extending between the central pillar 320 and the first to fourth outer walls 311 to 314. Strength of the tray 3 is enhanced by the partition wall 32.

In the present embodiment, four housing chambers 30 are formed inside the outer frame 31 of the tray 3, and one power distribution member 5 is housed in each housing chamber 30. A holding stand 33 to hold the power distribution member 5 is provided in the housing chamber 30. The holding stand 33 protrudes upward from a bottom wail 300 of each housing chamber 30. The housing chamber 30 opens upward, When the power distribution member 5 is taken out of the tray 3, the power distribution member 5 held by the holding stand 33 is lifted upward by, e.g., a worker manually or by a robotic hand. In this regard, the inside of the outer frame 31 of the tray 3 may be divided into more housing chambers 30, or plural power distribution members 5 may be housed in one housing chamber 30.

Of the trays 3, the tray 3 located at an end on the opening side of the housing chambers 30 in the stacking direction (located on the uppermost side) does not hold any of the power distribution members 5, as shown in FIG. 2. This is to prevent that a part of the packaging bag 4 enters inside the housing chambers 30 due to the atmospheric pressure during air evacuation and the power distribution members 5 are pressed against the packaging hag 4, or to prevent that a shock from above the package 2 is directly transmitted to the power distribution members 5 during transport, etc.

Figure 4A:
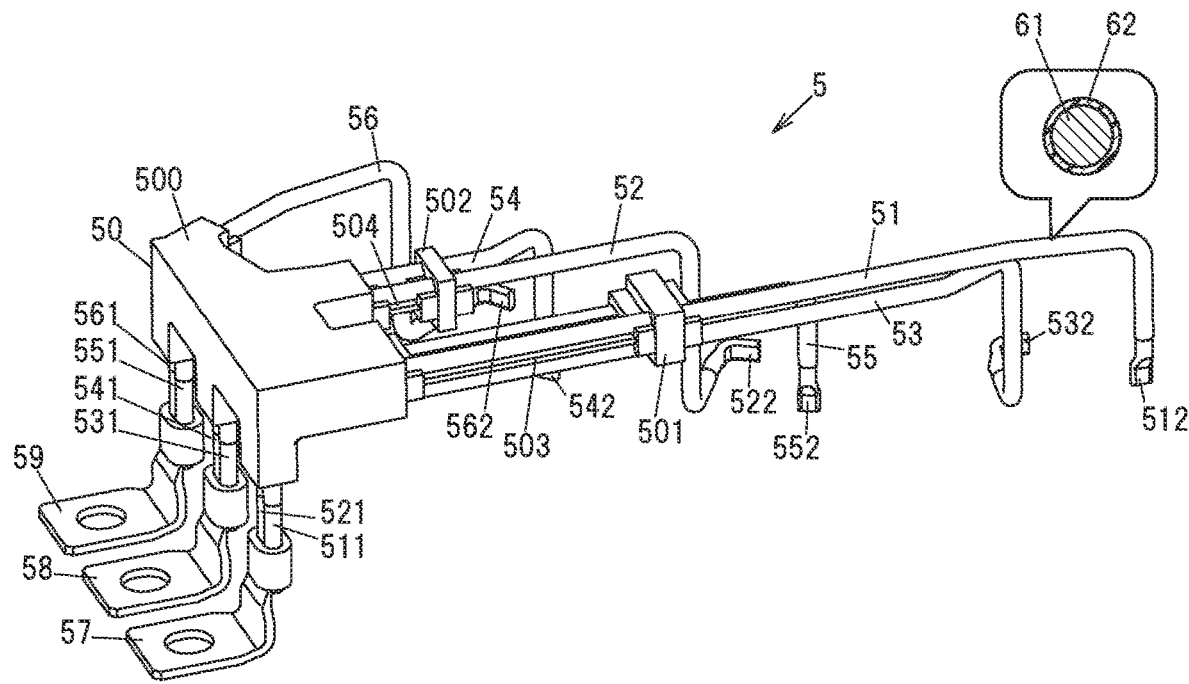
FIGS. 4A and 4B are perspective views showing a power distribution member When viewed from different directions.
Figure 4B:
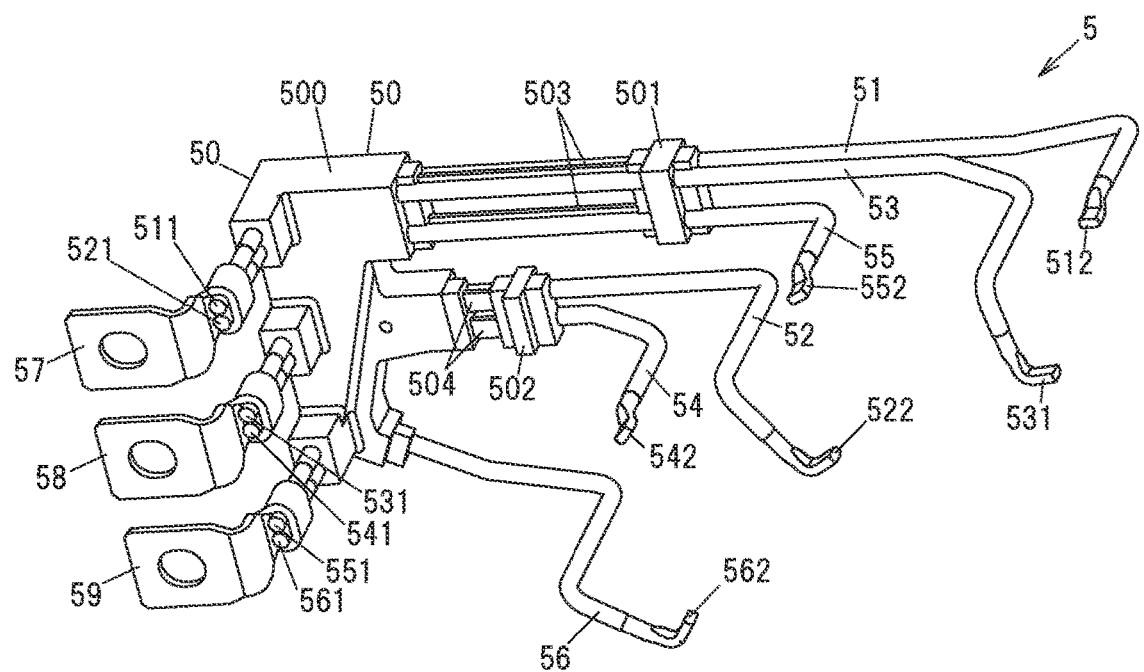

FIGS. 4A and 4B are perspective views showing the power distribution member 5 when viewed from different directions. The power distribution member 5 is a component to connect between a terminal block and windings of an electric motor used as a driving source for travel of an automobile, and has first to sixth conductive wires 51 to 56, a resin holder 50 to integrally hold the first to sixth conductive wires 51 to 56, and first to third terminals 57 to 59. The first to third terminals 57 to 59 are fixed by bolts to washers of the terminal block attached to., e.g., a housing that houses the electric motor.

The first to sixth conductive wires 51 to 56 are, e.g., single wires with a circular cross-sectional shape each formed by covering a metal conductor 61 of copper, etc., with an insulation 62 such as enamel as shown in a cross section. in a speech balloon of FIG. 4A, and are bent at plural locations. A diameter of the metal conductor 61 is, e.g., not less than 1 mm At end portions 511, 521, 531, 541, 551, 561 and other end portions 512, 522, 532, 542, 552, 562 of the first to sixth conductive wires 51 to 56, the insulation 62 is removed and the metal conductor 61 is exposed.

The first and second conductive wires 51, 52 are crimped together to the first terminal 57 at the end portions 511, 521 and supply, e.g., a U-phase current to the electric motor. The third and fourth conductive wires 53, 54 are crimped together to the second terminal 58 at the end portions 531, 541 and supply, e.g., a V-phase current to the electric motor. The fifth and sixth conductive wires 55, 56 are crimped together to the third terminal 59 at the end portions 551, 561 and supply, e.g., a W-phase current to the electric motor.

The other end portions 512, 522, 532, 542, 552, 562 of the first to sixth conductive wires 51 to 56 are connection portions to be connected to the windings of the electric motor as a connection target, and are formed in a flat shape by press working for easy connection to the windings. Connection between the other end portions 512, 522, 532, 542, 552, 562 of the first to sixth conductive wires 51 to 56 and the windings of the electric motor is performed by, e.g., fusing (thermal crimping), soldering, or spot welding.

The holder 50 holds portions of the first to sixth conductive wires 51 to 56 between the end portions 511, 521, 531, 541, 551, 561 and the other end portions 512, 522, 532, 542, 552, 562. Since the first to sixth conductive wires 51 to 56 are held by the holder 50, the positions of the other end portions 512, 522, 532, 542, 552, 562 of the first to sixth conductive wires 51 to 56 relative to the windings of the respective phases of the electric motor are suitable for connection to the windings.

The holder 50 integrally has a main body 500 holding respective portions of the first to sixth conductive wires 51 to 56, a first land portion 501 holding respective portions of the first, third and fifth conductive wires 51, 53, 55, a second land portion 502 holding respective portions of the second and fourth conductive wires 52, 54, a first coupling portion 503 connecting the main body 500 to the first land portion 501, and a second coupling portion 504 connecting the main body 500 to the second land portion 502.

Figure 5:
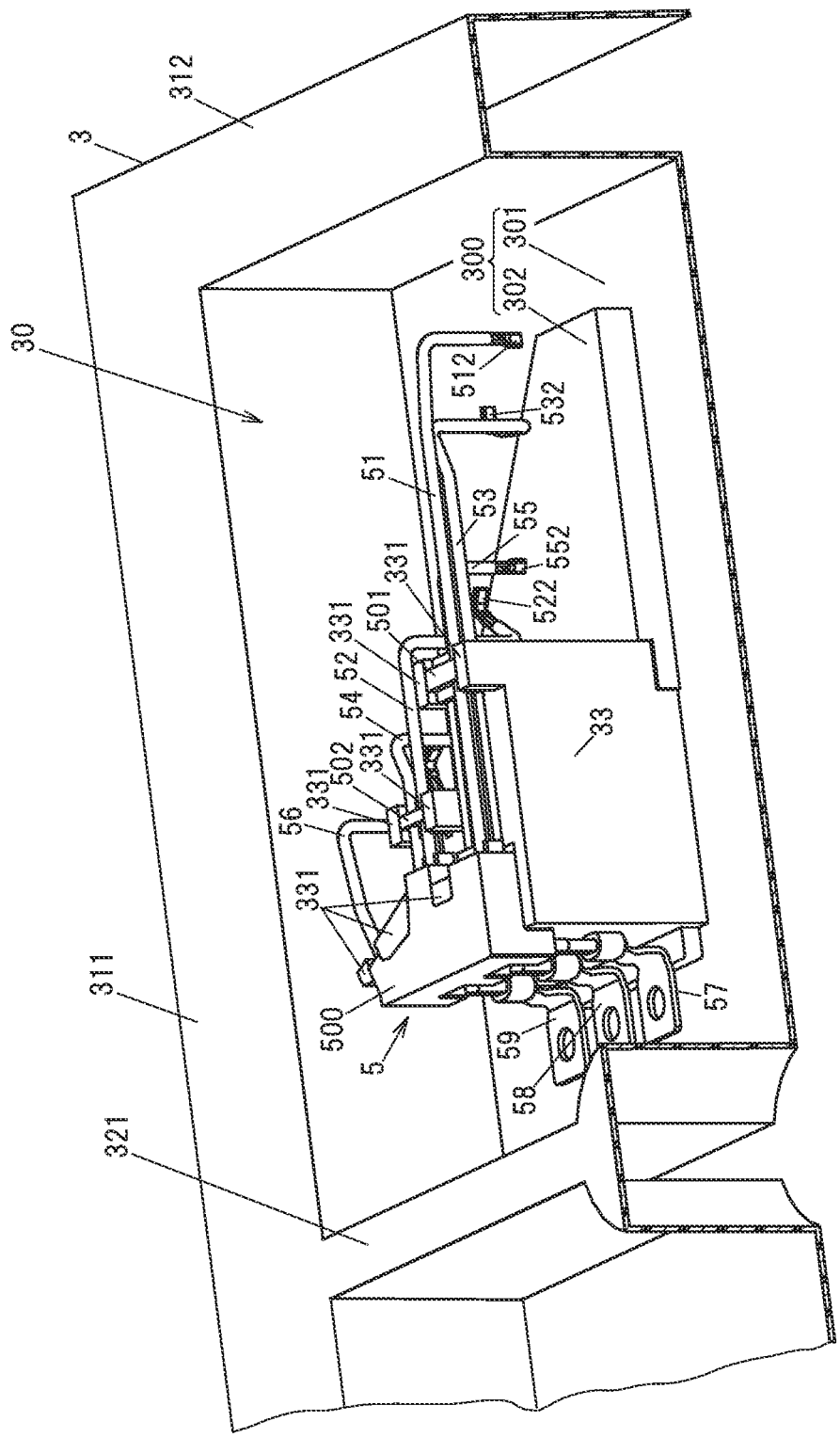
FIG. 5 is a perspective view showing one power distribution member arranged in a housing chamber of the tray.
Figure 6:
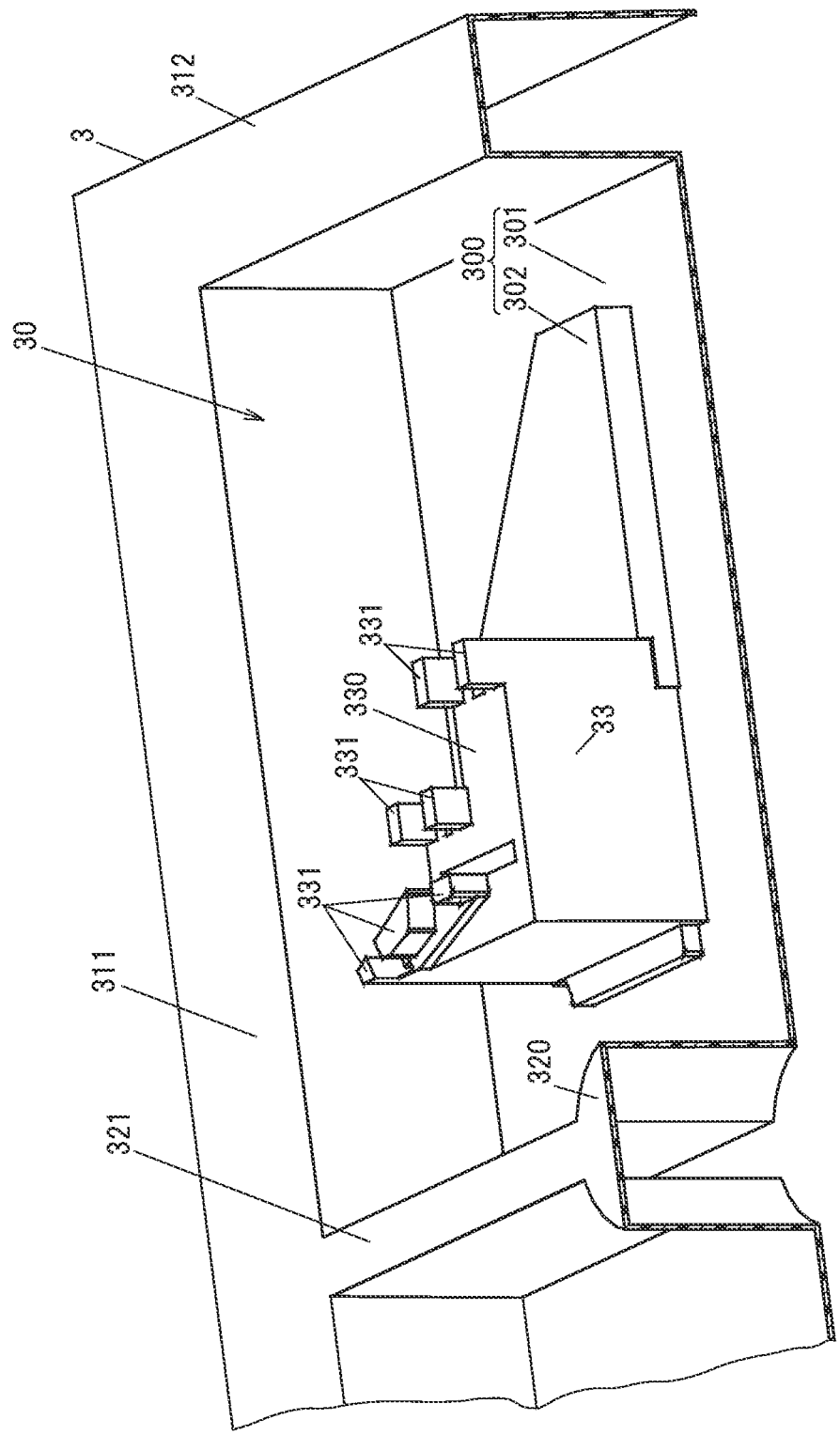
FIG. 6 is a perspective view showing a portion of the tray when the power distribution member is not arranged in the housing chamber.
Figure 7:
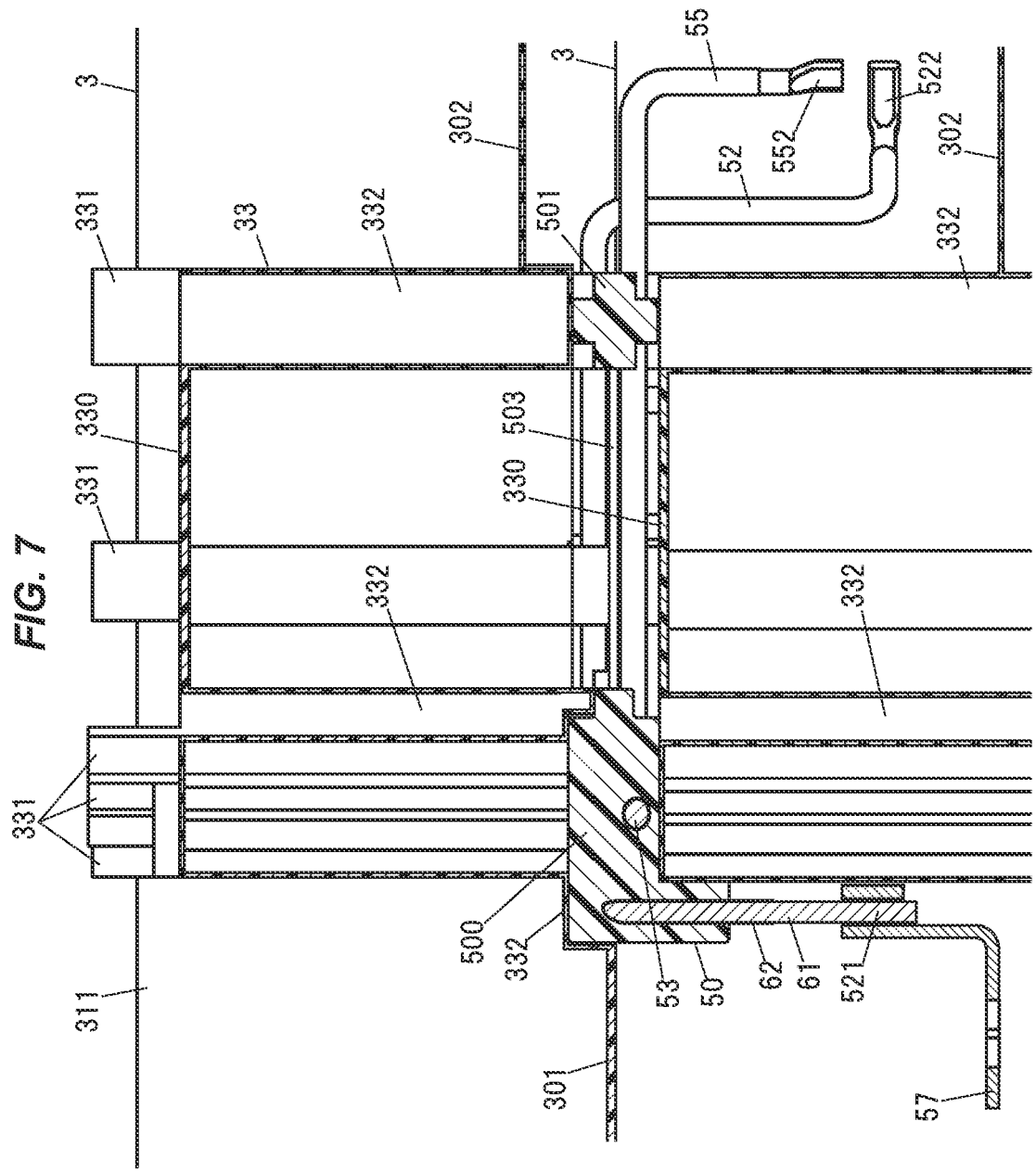
FIG. 7 is a cross-sectional view showing a state in which the power distribution member is arranged between a pair of trays stacked in a stacking direction.
Figure 8:
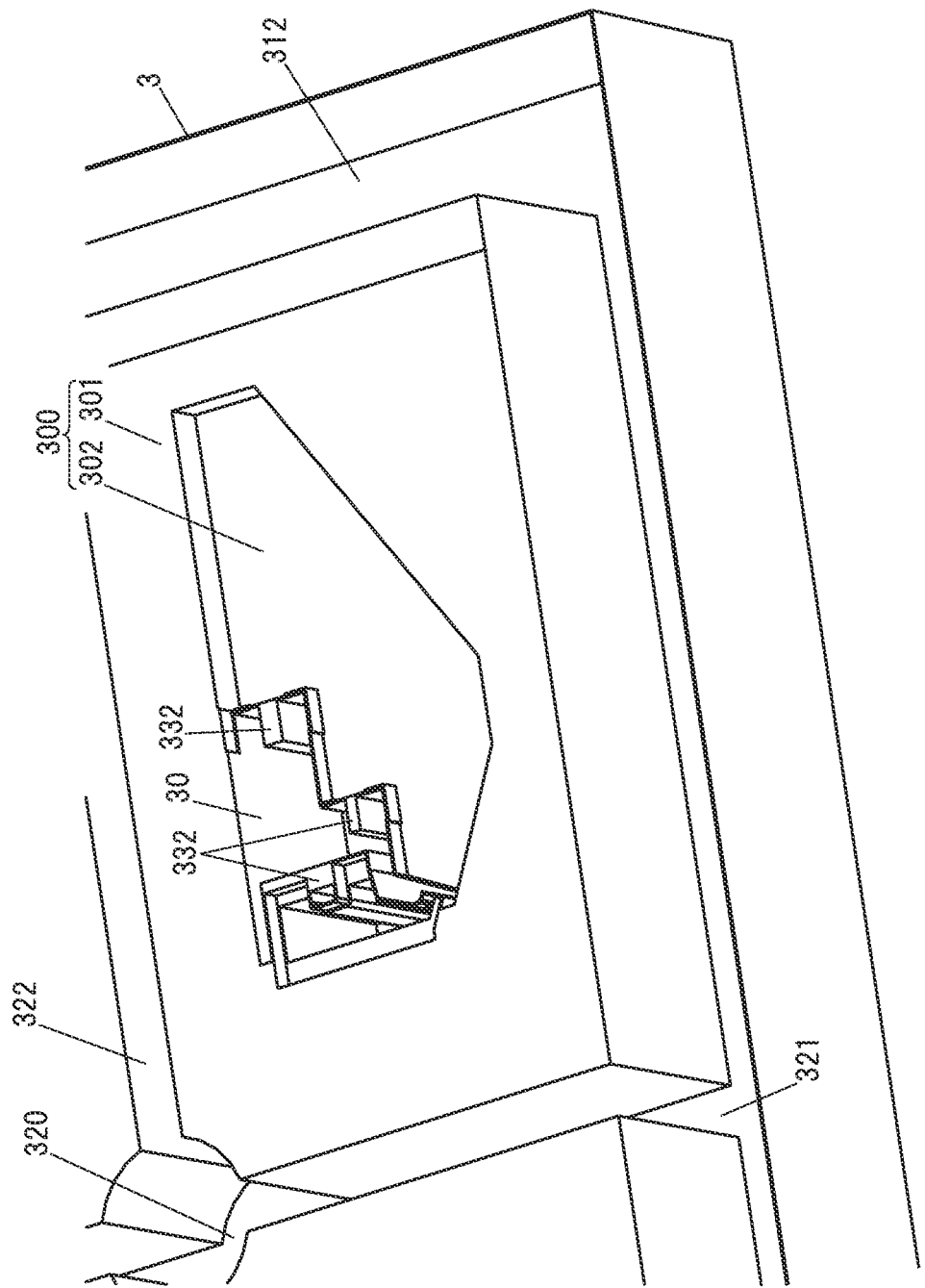
FIG. 8 is a perspective view showing a portion of the tray when viewed from below.

FIG. 5 is a perspective view showing one power distribution member 5 arranged in the housing chamber 30 of the tray 3. FIG. 6 is a perspective view showing a portion of the tray 3 when the power distribution member 5 is not arranged in the housing chamber 30, FIG. 7 is a cross-sectional view showing a state in which the power distribution member 5 is arranged between a pair of trays 3 stacked in the stacking direction. FIG. 8 is a perspective view showing a portion of the tray 3 when viewed from below.

As shown in FIGS. 5 and 6, the bottom wall 300 has a stepped structure composed of a lower step 301 and an upper step 302, and the upper step 302 is continuous to the holding stand 33. Rigidity of the bottom wall 300 is increased by this stepped structure.

As shown in FIG. 7, the holder 50 of the power distribution member 5 is sandwiched and held between a pair of stacked trays 3. .Hereinafter, one of the pair of trays 3 which is located on one side in the stacking direction (on the upper side) is referred to as the upper tray 3, and the other tray located on the other side in the stacking direction (on the lower side) is referred to as the lower tray 3.

The holding stand 33 is provided with plural upper protrusions 331 protruding upward from an arrangement surface 330 on which the power distribution member 5 is arranged, and lower protrusions 332 protruding downward from the arrangement surface 330. The holder 50 is sandwiched and held between the arrangement surface 330 of the lower tray 3 and the lower protrusions 332 of the upper tray 3. That is, the lower protrusions 332 serve as pressing portions that presses the holder 50 against the arrangement surface 330 of the lower tray 3.

The holder 50 is also positioned between the plural upper protrusions 331 of the lower tray 3, and inclination or misalignment of the holder 50 in a horizontal direction (a direction perpendicular to the stacking direction of the plural trays 3) relative to the arrangement surface 330 of the lower tray 3 is suppressed by the plural upper protrusions 331. That is, the upper protrusions 331 serve as locking portions to lock the holder 50.

The first to sixth conductive wires 51 to 56 are not in contact with either of the upper and lower trays 3. This is because if the first to sixth conductive wires 51 to 56 are in contact with the upper tray 3 or the lower tray 3, the positions of the end portions 511, 521, 531, 541, 551, 561 or the positions of the other end portions 512, 522, 532, 542., 552, 562 may change, resulting in that connection to the windings of the electric motor or connection of the first to third terminals 57 to 59 to the terminal block are not appropriately performed. In other words, to maintain good mechanical connection with the connection targets, the tray 3 is configured to hold the power distribution members 5 in a state in which the first to sixth conductive wires 51 to 56 are not in contact with the tray 3.

In addition, to maintain good electrical connection between the other end portions 512, 522, 532, 542, 552, 562 of the first to sixth conductive wires 51 to 56 and the windings of the electric motor, the package 2 is configured such that an oxygen concentration in the packaging bag 4 is lower than that in the atmosphere. An increase in electrical resistance at connection portions between the other end portions 512., 522, 532, 542, 552, 562 and the windings of the electric motor as a connection target due to oxidation of the metal conductors 61 is thereby suppressed. In this regard, a concentration of oxygen contained in the atmosphere is about 21%.

The package 2 is formed (manufactured) through a holding step of holding the plural power distribution members 5 in the trays 3, a housing step of housing the trays 3 holding the power distribution members 5 in the packaging bag 4, an oxygen reduction step of reducing an amount of oxygen in the packaging bag 4, and a closing step of hermetically closing an opening of the packaging bag 4. In the holding step, plural (five in the present embodiment) trays 3 in which the power distribution members 5 are arranged on the holding stands 33 are stacked, and one empty tray 3 is then stacked on the top. In the housing step, the plural trays 3 in a state of the stacked structure is housed in the packaging bag 4. In the oxygen reduction step, e.g., the air in the packaging bag 4 is evacuated by using a vacuum packaging machine. Alternatively, the amount of oxygen in the packaging bag 4 may be reduced by filling the packaging bag 4 with an inert gas such as nitrogen. in the closing step, the area around the opening of the packaging bag 4 is hermetically closed by heat fusing.

In the case of evacuating the air from the packaging bag 4 in the oxygen reduction step, pressure in the packaging bag 4 becomes lower than the atmospheric pressure and the oxygen concentration in the packaging bag 4 is thereby reduced. Meanwhile, in case of filling the packaging bag 4 with the inert gas in the oxygen reduction step, oxygen in the packaging bag 4 is evacuated in the course of filling with the inert gas and the oxygen concentration in the packaging bag 4 is thereby reduced. In this regard, in case of evacuating the air from the packaging bag 4 in the oxygen reduction step, the degree of vacuum in the packaging bag 4 is desirably not less than 70% (air pressure of not more than 30 kPa). In case of filling the packaging bag 4 with the inert gas in the oxygen reduction step, a percentage of oxygen in the air in the packaging bag 4 is desirably not more than 30%.

Modification

Figure 9:
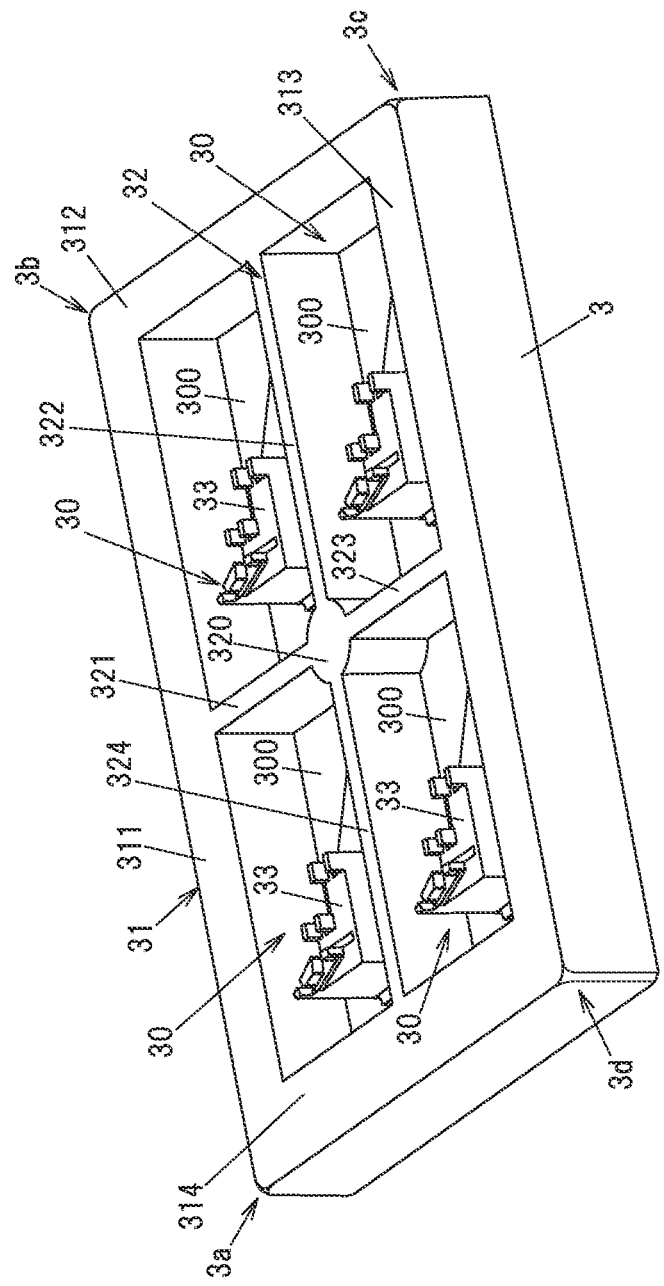
FIG. 9 is a perspective view showing a tray with chamfered corners in a modification.

FIG. 9 is a perspective view showing the tray 3 with chamfered corners 3a to 3d in a modification. By chamfering the corners 3a to 3d, it is possible to suppress damage on the packaging bag 4 (tearing or puncture of the packaging bag 4 by contact with corners) caused by negative pressure when the air in the packaging bag 4 is evacuated in the oxygen reduction step.

Summary of the embodiment

Technical ideas understood from the embodiment will be described below citing the reference signs, etc., used for the embodiment. However, each reference sign described below is not intended to limit the constituent elements in the claims to the members, etc., specifically described in the embodiment.

[1] A package (2) in which a power distribution member (5) comprising a plurality of conductive wires (51-56) is sealed in a packaging hag (4), wherein an oxygen concentration in the packaging bag (4) is lower than an oxygen concentration in an atmosphere.

[2] The package (2) defined by [1], wherein air pressure in the packaging bag (4) is lower than an atmospheric pressure.

[3] The package (2) defined by [1] or [2], wherein the packaging bag (4) is filled with an inert gas.

[4] The package (2) defined by any one of [1] to [3], wherein a plurality of the power distribution members (5) and a tray (3) holding the plurality of the power distribution members (5) are sealed together in the packaging bag (4), wherein the tray (3) comprises an outer frame (31) and a partition wall (32) dividing the inside of the outer frame (31) into a plurality of housing chambers, and wherein the power distribution member (5) is held in each of the plurality of housing chambers (30).

[5] The package (2) defined by [4], wherein the plurality of conductive wires (51-56) are not in contact with the tray (3).

[6] The package (2) defined by [4] or [5], wherein a plurality of the trays (3) are stacked in the packaging bag (4), wherein the power distribution member (5) comprises a resin holder (50) integrally holding the plurality of conductive wires (51-56), and wherein the holder (50) is sandwiched and held between a pair of the stacked trays (3).

[7] The package (2) defined by [6], wherein each of the plurality of the trays (3) is open on one side in a stacking direction, and wherein the power distribution members (5) are not held in one of the plurality of trays (3) that is located at an end on the opening side.

[8] A method for manufacturing the package (2) defined by any one of [4] to [7], comprising: holding the plurality of the power distribution members (5) in the trays (3); housing the trays (3) holding the power distribution members (5) in the packaging bag (4); reducing an amount of oxygen in the packaging bag (4); and hermetically closing an opening of the packaging bag (4).

Although the embodiment of the invention has been described, the invention according to claims is not to be limited to the embodiment described above. Further, please note that not all combinations of the features described in the embodiment are necessary to solve the problem of the invention.

The invention claimed is:

1. A package in which a power distribution member comprising a plurality of conductive wires is sealed in a packaging bag,
wherein an oxygen concentration in the packaging bag is lower than an oxygen concentration in an atmosphere,
wherein a plurality of the power distribution members and a tray holding the plurality of the power distribution members are sealed together in the packaging bag, wherein the tray comprises an outer frame and a partition wall dividing an inside of the outer frame into a plurality of housing chambers, and wherein the power distribution member is held in each of the plurality of housing chambers, and
wherein a plurality of the trays are stacked in the packaging bag, wherein the power distribution member comprises a resin holder integrally holding the plurality of conductive wires, and wherein the holder is sandwiched and held between a pair of the stacked trays.

2. The package according to claim 1, wherein air pressure in the packaging bag is lower than an atmospheric pressure.

3. The package according to claim 1, wherein the packaging bag is filled with an inert gas.

4. The package according to claim 1, wherein the plurality of conductive wires are not in contact with the tray.

5. The package according to claim 1, wherein each of the plurality of the trays is open on one side in a stacking direction, and wherein the power distribution members are not held in one of the plurality of trays that is located at an end on the opening side.

6. A method for manufacturing the package according to claim 1, the method comprising: holding the plurality of the power distribution members so as to be held in the trays; housing the trays holding the power distribution members in the packaging bag; reducing an amount of oxygen in the packaging bag; and hermetically closing an opening of the packaging bag.

* * * * *